(12) United States Patent
Glenn et al.

(10) Patent No.: US 10,298,543 B2
(45) Date of Patent: May 21, 2019

(54) REAL-TIME ASSOCIATION OF A POLICY-BASED FIREWALL WITH A DYNAMIC DNS HOSTNAME

(71) Applicant: Verisign, Inc., Reston, VA (US)

(72) Inventors: Nathan Glenn, Leesburg, VA (US); Sameer Thakar, Leesburg, VA (US)

(73) Assignee: VERISIGN, INC., Reston, VA (US)

( * ) Notice: Subject to any disclaimer, the term of this patent is extended or adjusted under 35 U.S.C. 154(b) by 196 days.

(21) Appl. No.: 15/376,533

(22) Filed: Dec. 12, 2016

(65) Prior Publication Data

US 2018/0167362 A1   Jun. 14, 2018

(51) Int. Cl.
  *H04L 29/06* (2006.01)
  *H04L 29/12* (2006.01)

(52) U.S. Cl.
  CPC ...... *H04L 63/0263* (2013.01); *H04L 61/1511* (2013.01); *H04L 61/2076* (2013.01); *H04L 63/0236* (2013.01); *H04L 63/08* (2013.01); *H04L 63/10* (2013.01)

(58) Field of Classification Search
  CPC ............. H04L 63/0263; H04L 61/1511; H04L 61/2076; H04L 63/0236; H04L 63/08; H04L 63/10
  See application file for complete search history.

(56) References Cited

U.S. PATENT DOCUMENTS

| | | | | |
|---|---|---|---|---|
| 7,451,234 B1 * | 11/2008 | Bonner | ............. | H04L 29/12066 709/220 |
| 8,621,556 B1 * | 12/2013 | Bharali | ............... | H04L 61/1511 726/1 |
| 8,824,299 B1 * | 9/2014 | Caputo, II | .............. | H04L 45/22 370/235 |
| 9,015,318 B1 * | 4/2015 | Batz | .................... | H04L 61/1511 709/217 |
| 9,038,151 B1 * | 5/2015 | Chua | ....................... | H04L 45/02 709/223 |

(Continued)

OTHER PUBLICATIONS

Extended European Search Report for Application No. 17206740.7 dated Apr. 19, 2018.

(Continued)

*Primary Examiner* — Joseph P Hirl
*Assistant Examiner* — Stephen T Gundry
(74) *Attorney, Agent, or Firm* — Artegis Law Group, LLP

(57) ABSTRACT

Various embodiments of the invention disclosed herein provide techniques for associating a firewall policy with a dynamic domain name system (DNS) hostname. A policy configuration portal associates a first hostname with a first network address. The policy configuration portal sets firewall policy configuration associated with the first hostname to include the first network address. The policy configuration portal receives a first message that associates a DNS hostname with a second network address. The policy configuration portal, in response to receiving the first message, associates the second network address with the first hostname. The policy configuration portal modifies a firewall policy configuration associated with the first hostname to include the second network address. At least one advantage of the disclosed techniques is that a firewall policy can be implemented for a residential home or small business that employs dynamic IP addressing.

20 Claims, 7 Drawing Sheets

(56) References Cited

U.S. PATENT DOCUMENTS

| | | | | |
|---|---|---|---|---|
| 9,197,538 | B2* | 11/2015 | Hopen | G06F 21/6218 |
| 9,736,185 | B1* | 8/2017 | Belamaric | H04L 63/20 |
| 2002/0010798 | A1* | 1/2002 | Ben-Shaul | G06F 17/3089 709/247 |
| 2004/0249975 | A1* | 12/2004 | Tuck | H04L 29/12066 709/245 |
| 2007/0121596 | A1* | 5/2007 | Kurapati | H04L 29/06027 370/356 |
| 2007/0271453 | A1* | 11/2007 | Pohja | H04L 63/029 713/153 |
| 2009/0172192 | A1* | 7/2009 | Christian | H04L 29/12132 709/242 |
| 2012/0311693 | A1* | 12/2012 | Horman | H04L 63/0263 726/14 |
| 2013/0205018 | A1* | 8/2013 | Rahman | H04L 67/16 709/224 |
| 2013/0298182 | A1* | 11/2013 | May | H04L 63/0272 726/1 |
| 2014/0052984 | A1* | 2/2014 | Gupta | H04W 12/06 713/162 |
| 2014/0181186 | A1* | 6/2014 | Stevens | H04L 67/322 709/203 |
| 2015/0113172 | A1* | 4/2015 | Johnson | H04L 67/34 709/245 |
| 2015/0188949 | A1* | 7/2015 | Mahaffey | H04L 63/20 726/1 |
| 2016/0087933 | A1* | 3/2016 | Johnson | H04W 4/70 709/245 |
| 2016/0234249 | A1* | 8/2016 | Wong | H04L 63/1458 |
| 2016/0248813 | A1* | 8/2016 | Byrnes | H04L 63/20 |
| 2017/0085549 | A1* | 3/2017 | Donaldson | H04L 29/06 |
| 2017/0272316 | A1* | 9/2017 | Johnson | H04L 61/301 |
| 2017/0279803 | A1* | 9/2017 | Desai | H04L 63/0884 |
| 2017/0310709 | A1* | 10/2017 | Foxhoven | H04L 63/20 |
| 2017/0331789 | A1* | 11/2017 | Kumar | H04L 63/0272 |
| 2017/0331859 | A1* | 11/2017 | Bansal | H04L 67/16 |
| 2017/0332238 | A1* | 11/2017 | Bansal | H04W 12/08 |
| 2017/0359326 | A1* | 12/2017 | Garcia | H04L 63/08 |
| 2018/0013792 | A1* | 1/2018 | Glenn | H04L 63/0263 |
| 2018/0097787 | A1* | 4/2018 | Murthy | H04L 63/08 |
| 2018/0097788 | A1* | 4/2018 | Murthy | H04L 63/0227 |
| 2018/0097789 | A1* | 4/2018 | Murthy | H04L 63/08 |
| 2018/0145986 | A1* | 5/2018 | Chien | H04L 63/101 |
| 2018/0198796 | A1* | 7/2018 | Chien | H04L 63/101 |

OTHER PUBLICATIONS

Paddy69: "Dynamic IP and Content Filtering", Mar. 6, 2014, retrieved from https://support.opendns.com/hc/en-us/commmunity/posts/220007467-Dynamic-IP-and-content-filtering, retrieved on Apr. 11, 2018, pp. 1-5.

"PRWeb ebooks—Another online visibility tool from PRWeb OpenDNS Announces DNS-O-Matic: Free Service to Simplify Residential ISP and Small Businesses' Dynamic DNS Service", Dec. 3, 2007 retrieved from http://www.prweb.com/pdfdownload/573680.pdf, retrieved on Apr. 11, 2018, pp. 1-3.

"OpenDNS—Wikipedia", Dec. 3, 2016, retrieved from https://en.wikipedia.org/w/index.php?title=OpenDNS&oldid=752834567, retrieved on Apr. 12, 2018, pp. 1-8.

* cited by examiner

US 10,298,543 B2

REAL-TIME ASSOCIATION OF A POLICY-BASED FIREWALL WITH A DYNAMIC DNS HOSTNAME

BACKGROUND OF THE INVENTION

Field of the Invention

The present invention relates generally to computer networks and, more specifically, to real-time association of a policy-based firewall with a dynamic DNS hostname.

Description of the Related Art

In the domain of computer networks, a firewall provides protection and security for one or more computing devices connected to a network. Among other things, the firewall monitors and controls incoming and outgoing network messages on behalf of the one or more computing devices. The firewall commonly performs these monitoring and control operations by applying security rules or policies to the incoming and outgoing messages. As a result, the firewall establishes a barrier or filter between a trusted, secure internal network shared by the one or more computing devices and a larger external network, such as the internet, that is presumed to be untrustworthy or unsecure.

During operation, the firewall typically applies the security rules or policies based on a block of one or more static internet protocol (IP) addresses. The firewall can be configured to filter either or both of incoming network traffic directed to an internal network and outgoing network traffic directed to an external network. As the firewall intercepts each network message, the firewall identifies the source IP address associated with the network message, identifies a block of static IP addresses to which the source IP address belongs, and applies the appropriate security rules or policies to the network message based on the block of static IP addresses. In so doing, the firewall filters or discards network messages considered to be untrustworthy or unsecure, according to the security rules and policies, and passes trusted, secure messages between the one or more computing devices and the external network.

One drawback of the above approach is that blocks of static IP addresses are expensive to purchase or lease. For example, the cost to purchase or lease a large block of static IP addresses could cost millions of dollars, paid to an internet authority that registers and maintains such blocks of static IP addresses. Smaller blocks of static IP addresses can be purchased or leased from an internet service provider (ISP), but purchasing or leasing even small blocks of IP addresses typically involves expensive fees. Consequently, usually only relatively large enterprises can afford to purchase or lease blocks of static IP addresses.

Another drawback of the above approach is that, because of the above noted cost concerns, ISPs oftentimes employ dynamic IP addressing for smaller entities, such as residential homes and small businesses. With dynamic IP addressing, the IP address associated with a given computing device for a home or small business changes at more or less regular intervals, such as once per week, once per day, or once every few hours. When a current IP address expires at the end of the regular interval, the ISP providing service for the computing device issues a new IP address for the computing device. However, as described, firewalls apply security rules or policies based on the source IP addresses associated with network messages. Consequently, IP addresses that change dynamically are incompatible with conventional firewalls. Accordingly, traditional firewalls are generally unable to properly protect computers located in homes and small businesses where dynamic IP addressing is employed.

One approach to solving the dynamic IP addressing problem is for ISPs to offer custom firewall solutions to their customers. However, these custom firewall solutions often require proprietary software to be pre-installed on a specified model and brand of internet router. The proprietary software usually applies a chaining policy to the router. The chaining policy enables the router to pass through any changes in IP address to the custom firewall solution provider via a proprietary application protocol interface (API). Although custom firewall solutions can ultimately provide the necessary protection for homes and smaller business, the proprietary software and specified router are expensive, and a certain level of expertise is needed to make informed choices about which solutions are most appropriate for a given home or small business.

Another approach to solving the dynamic IP addressing problem is to poll the dynamic DNS provider at technically feasible intervals, such as once every four hours or once every three days, to determine whether the IP addresses associated with dynamic DNS hostnames have changed since the immediately preceding polling cycle. If a given hostname has a new IP address, then the firewall policy for the hostname can be updated with the new IP address. However, if a particular dynamic DNS provider is polled with respect to a particular hostname shortly before a new IP address issues for the hostname, then a substantial amount of time may pass where the firewall rules or policies for the hostname are associated with an obsolete IP address. In such cases, no firewall protection or DNS traffic filtering is available for the hostname until at least the next polling cycle.

As the foregoing illustrates, what is needed in the art is a more effective firewall solution in cases where dynamic IP addressing is implemented.

SUMMARY OF THE INVENTION

Various embodiments of the present application set forth a method for associating a firewall policy with a dynamic domain name system (DNS) hostname. The method includes associating a first hostname with a first network address. The method further includes setting a firewall policy configuration associated with the first hostname to include the first network address. The method further includes receiving a first message that associates a DNS hostname with a second network address. The method further includes, in response to receiving the first message, associating the second network address with the first hostname. The method further includes modifying a firewall policy configuration associated with the first hostname to include the second network address.

Other embodiments of the present invention include, without limitation, a computer-readable medium including instructions for performing one or more aspects of the disclosed techniques, as well as a computing device for performing one or more aspects of the disclosed techniques.

At least one advantage of the disclosed techniques is that a firewall policy can be implemented for a residential home or small business that employs dynamic IP addressing. As a result, residential and small business users do not need to incur the expense of purchasing or leasing static IP addresses. Another advantage of the disclosed techniques is that changes are transmitted to the policy configuration portal soon after the new ISP address is received by the router. As a result, the amount of time that firewall protection is unavailable to dynamic DNS clients is reduced relative to prior approaches.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that embodiments of the present invention may be practiced without one or more of these specific details.

System Overview

Figure 1:
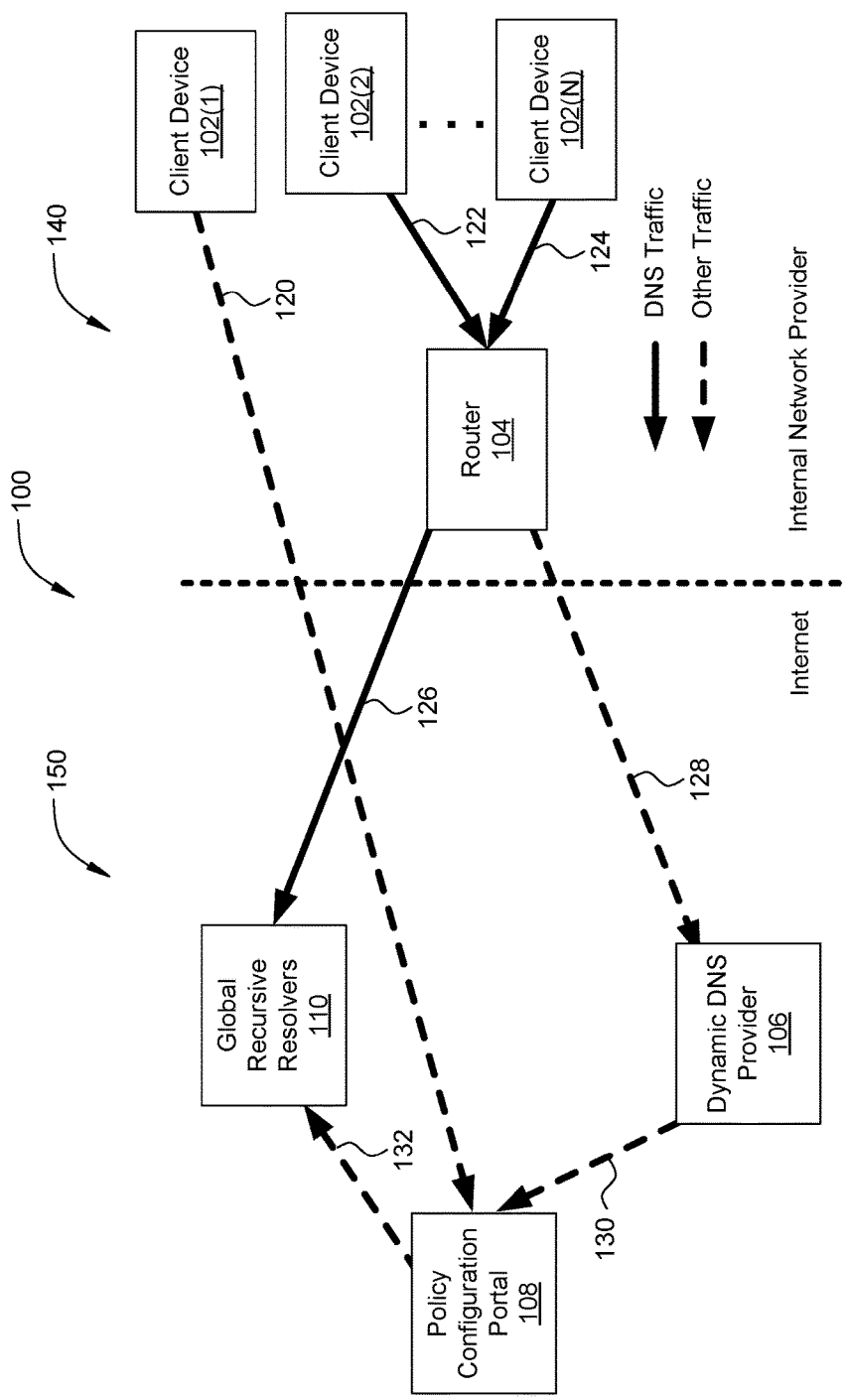
FIG. 1 illustrates a system configured to implement one or more aspects of the present invention.

FIG. 1 illustrates a system 100 configured to implement one or more aspects of the present invention. As shown, the system includes, without limitation, client devices 102(1), 102(2), . . . 102(N), a router 104, a dynamic DNS provider 106, a policy configuration portal 108, and global recursive resolvers 110. Client devices 102(1), 102(2), . . . 102(N) and router 104 are associated with an internal network 140. Client devices 102(1), 102(2), . . . 102(N) and router 104 communicate with other devices connected to the internet 150, including, without limitation, dynamic DNS provider 106, policy configuration portal 108, and global recursive resolvers 110.

Client devices 102(1), 102(2), . . . 102(N) include any types of computing devices associated with an internal network 140. Each of the client devices 102(1), 102(2), . . . 102(N) includes a computing device that may be a personal computer, video game console, personal digital assistant, mobile phone, mobile device, or any other device suitable for implementing one or more aspects of the present invention.

Client device 102(1) communicates with policy configuration portal 108 over communications link 120. In some embodiments, client device 102(1) may communicate with policy configuration portal 108 via router 104 through an alternative communications link (not explicitly shown). In operation, client device 102(1) transmits information to policy configuration portal 108 to communicate information associated with internal network 140, including, without limitation, the dynamic DNS hostname associated with router 104 and various firewall rules and policies associated with router 104.

A hostname is associated with a particular a computing device connected to a computer network, such as the internet. The hostname uniquely identifies the computing device to other devices within a given network. A name service, such as DNS, provides a mechanism for translating the hostname to a network address, such as an IP address, or vice versa. Various servers distributed throughout the network provide translations between hostnames and corresponding network addresses. Such servers are referred to herein as name servers. These name servers support translations for hostnames associated with static IP addresses, hostnames associated with dynamic DNS services, or both.

The process of translating the hostname to a network address, such as an IP address, is referred to herein as "resolving" the hostname to the network address. In the context of internet communications, a hostname can include any one or more of the following components: (1) a host specific label; (2) a domain name, such as a domain name registered with a service such as DNS; and (3) a top-level domain (TLD) such as .com, .net, or .edu. A hostname that includes all three of these components is typically referred to as a fully qualified domain name (FQDN).

In various embodiments, the communications between client device 102(1) and policy configuration portal 108 may be DNS traffic or other types of traffic. Client devices 102(2) . . . 102(N) communicate with various devices connected to the internet 150, such as global recursive resolvers 110 via router 104. Specifically, client device 102(2) communicates with various devices connected to the internet 150 via router 104 through communications link 122. Likewise, client device 102(N) communicates with various devices connected to the internet 150 via router 104 through communications link 124. In some embodiments, client device 102(1) may also communicate via router 104 with various devices connected the internet 150, such as global recursive resolvers 110 through a communications link (not explicitly shown).

Router 104 includes any router configured to support dynamic DNS routing. Router 104 includes a computing device that may be a personal computer, router controller, server, mobile device, or any other device suitable for implementing one or more aspects of the present invention. In operation, router 104 routes various DNS traffic and other network messages between client devices 102(1), 102(2), . . . 102(N) and various devices connected to the internet 150, such as global recursive resolvers 110. For example, router 104 could exchange DNS traffic with client devices 102(2) and 102(N) through communications links 122 and 124, respectively. Router 104, in turn, exchanges DNS traffic with various devices connected to the internet 150, such as global recursive resolvers 110 through communications link 126. In various embodiments, router 104 may include additional information with outgoing DNS traffic such as customer profile specific resolution information. This customer profile specific resolution information may include, without limitation, client device identifier, username, age of the user, and geographic location. Periodically, router 104 receives a new IP address from an ISP (not explicitly shown). In some embodiments, router 104 receives a new IP address at regular intervals, including, without limitation, once every few hours, once per day, or once per week. In some embodiments, router 104 receives a new IP address upon the occurrence of a particular event.

In response to receiving a new IP address, router 104 connects to dynamic DNS provider 106 via communications link 128. Router 104 transmits a message to one or more name servers associated with dynamic DNS provider 106 over communications link 128. In various embodiments, this message may be DNS traffic or other types of traffic. The message includes the new IP address and the corresponding hostname.

Dynamic DNS provider 106 communicates with router 104 via communications link 128. Dynamic DNS provider 106 includes one or more name servers that receive messages from router 104, where such messages include the new IP address for router 104 along with the corresponding hostname. Each of the name servers includes a computing device that may be a personal computer, router controller, server, mobile device, or any other device suitable for implementing one or more aspects of the present invention. In response to receiving a messages from router 104, one or more of the name servers associated with dynamic DNS provider 106 update a record in a names database to reflect the new IP address associated with the hostname, as specified by the received message.

Further, when dynamic DNS provider 106 receives message from a router 104 that includes a new IP address for router 104, dynamic DNS provider 106 transmits an update message to policy configuration portal 108 that includes the hostname associated with router 104 and the new IP address for router 104. In some embodiments, the update message may include authentication information, such as a token, that authenticates the identity of dynamic DNS provider 106. In some embodiments, the update message may include additional information such as an identifier of the dynamic DNS provider 106 or router 104 that transmitted the update message. Further, the update message may include customer profile specific resolution information. This customer profile specific resolution information may include, without limitation, client device identifier, username, age of the user, and geographic location.

Policy configuration portal 108 communicates with client device 102(1) over communications link 120. Policy configuration portal 108 includes a computing device that may be a personal computer, router controller, server, mobile device, or any other device suitable for implementing one or more aspects of the present invention. When a new account is initially provisioned, policy configuration portal 108 receives information associated with internal network 140, including, without limitation, the dynamic hostname associated with router 104 and various firewall rules and policies associated with router 104. The firewall rules and policies may specify when traffic is suppressed for certain ports, user account names, certain client devices, and so on. Policy configuration portal 108 then updates a record in a policy configuration database related to the dynamic hostname associated with router 104 to reflect the received information. After initial provisioning is complete, policy configuration portal 108 may receive updated information, such as new or modified firewall policy configuration for a particular hostname. Policy configuration portal 108 then modifies the record in the policy configuration database associated with router 104 to reflect the received information. Further, policy configuration portal 108 receives an initial IP address for the dynamic hostname. Policy configuration portal 108 sets the firewall policy configuration associated with the dynamic hostname to include the initial IP address.

Policy configuration portal 108 receives update messages from one or more name servers associated with dynamic DNS provider 106. The update message includes the hostname associated with router 104 and the new IP address for the hostname associated with router 104. If the message includes authentication information, such as a token, policy configuration portal 108 authenticates the identity of dynamic DNS provider 106. In some embodiments, policy configuration portal 108 searches a database to determine whether dynamic DNS provider 106 is authorized to change the IP address for the hostname identified in the message. If dynamic DNS provider 106 is authorized to change the IP address for the hostname, then policy configuration portal 108 associates the hostname with the new IP address by updating the current information for the hostname in the policy configuration database to reflect the new IP address. In so doing, policy configuration portal 108 modifies the firewall policy configuration associated with the hostname to include the new IP address. If dynamic DNS provider 106 is not authorized to change the IP address for the hostname, then policy configuration portal 108 discards the message without updating the current information for the hostname in the policy configuration database.

Further, the update message may include customer profile specific resolution information. This customer profile specific resolution information may include, without limitation, client device identifier, username, age of the user, and geographic location. If the update message includes such customer profile specific resolution information, then policy configuration portal 108 updates the firewall policy configuration associated with the hostname to include the customer profile specific resolution information.

In various embodiments, messages exchanged between policy configuration portal 108 and the one or more name servers associated with dynamic DNS provider 106 may be DNS traffic or other types of traffic. In one example, and without limitation, dynamic DNS provider 106, when communicating over communication link 130, would be transmitting an update message in the form of a DNS lookup for a given FQDN. In such cases, the communications over communication link 130 would be DNS traffic.

Further, policy configuration portal 108 transmits messages to one or more global recursive resolvers 110 through communications link 132. In various embodiments, these messages may be DNS traffic or other types of traffic. The messages include the new IP address associated with the hostname and the corresponding firewall policy configuration, or at least a portion thereof. In so doing, policy configuration portal 108 sets the firewall policy configuration, including firewall rules or policies, within global recursive resolvers 110 for the new IP address. Correspondingly, in some embodiments, policy configuration portal 108 may further transmit messages to global recursive resolvers 110 with instructions to remove firewall policy configurations related to expired IP addresses.

Global recursive resolvers 110 receive DNS traffic from various routers, such as router 104, over communications link 126. Each of the global recursive resolvers 110 includes a computing device that may be a personal computer, router controller, server, mobile device, or any other device suitable for implementing one or more aspects of the present invention. The DNS traffic includes network messages related to requests for content from various content sources on the internet 150. In some embodiments, the DNS traffic may include additional information for the purpose of applying certain firewall rules and policies. This additional information may include, without limitation, a user account name and a client device identifier. Global recursive resolvers 110 resolve these requests for content by determining the IP addresses for one or more sources of the requested content. Global recursive resolvers 110 discover and perform the needed routing to transfer content between router 104 and content sources. Global recursive resolvers 110 also monitor source IP addresses of the network messages in the DNS traffic to see if one or more firewall rules or policies are to be applied to the network messages. In the case of static IP addresses, global recursive resolvers 110 compare the source IP address to one or more blocks of static IP addresses associated with a firewall service. If the source IP address for a network message maps to one of the static IP blocks, global recursive resolvers 110 apply the firewall rules or policies associated with the corresponding static IP address block to the network message prior to routing the network message.

In the case of dynamic addresses, global recursive resolvers 110 periodically receive messages from policy configuration portal 108. In various embodiments, these messages may be DNS traffic or other types of traffic. The messages include new IP address associated with a dynamic DNS hostname and the corresponding firewall policy configuration, or at least a portion thereof, including firewall rules or policies. In response, global recursive resolvers 110 apply the received firewall policy configuration including firewall rules or policies, to the new IP address. In some embodiments, global recursive resolvers 110 may further receive messages from policy configuration portal 108 with instructions to remove firewall policy configurations related to expired IP addresses.

In general, global recursive resolvers 110 are geographically dispersed, where each of a group of edge sites in different geographical locations is equipped with multiple global recursive resolvers 110. In one example, and without limitation, 15 to 20 edge sites are deployed in various geographical locations on the globe, where each edge is equipped with 10 to 20 global recursive resolvers 110. Such a deployment of global recursive resolvers 110 at geographically diverse edge site locations help to reduce the latency between routers, such as router 104, and content sources, regardless of where the routers are content sources are located.

Real-Time Association of a Policy-Based Firewall with a Dynamic DNS Hostname

Figure 2:
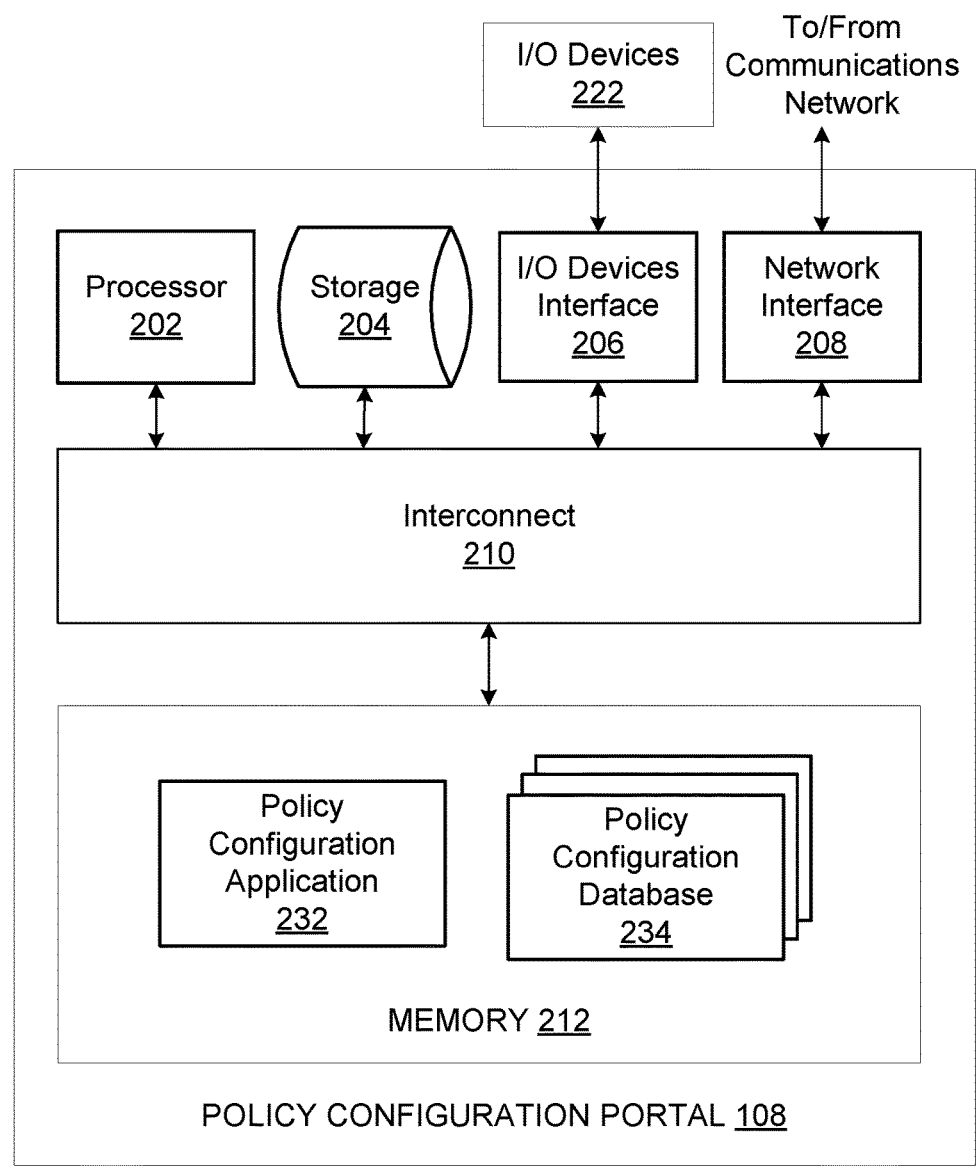
FIG. 2 is a more detailed illustration of the policy configuration portal of FIG. 1, according to various embodiments of the present invention.

FIG. 2 is a more detailed illustration of policy configuration portal 108 of FIG. 1, according to various embodiments of the present invention. As shown, policy configuration portal 108 includes, without limitation, a central processing unit (CPU) 202, storage 204, an input/output (I/O) devices interface 206, a network interface 208, an interconnect 210, and a system memory 212.

The processor 202 retrieves and executes programming instructions stored in the system memory 212. Similarly, the processor 202 stores and retrieves application data residing in the system memory 212. The interconnect 210 facilitates transmission, such as of programming instructions and application data, between the processor 202, input/output (I/O) devices interface 206, storage 204, network interface 208, and system memory 212. The I/O devices interface 206 is configured to receive input data from user I/O devices 222. Examples of user I/O devices 222 may include one or more buttons, a keyboard, and a mouse or other pointing device. The I/O devices interface 206 may also include an audio output unit configured to generate an electrical audio output signal, and user I/O devices 222 may further include a speaker configured to generate an acoustic output in response to the electrical audio output signal. Another example of a user I/O device 222 is a display device that generally represents any technically feasible means for generating an image for display. For example, the display device could be a liquid crystal display (LCD) display, CRT display, or DLP display. The display device may be a TV that includes a broadcast or cable tuner for receiving digital or analog television signals.

Processor 202 is included to be representative of a single CPU, multiple CPUs, a single CPU having multiple processing cores, and the like. And the system memory 212 is generally included to be representative of a random access memory. The storage 204 may be a disk drive storage device. Although shown as a single unit, the storage 204 may be a combination of fixed and/or removable storage devices, such as fixed disc drives, floppy disc drives, tape drives, removable memory cards, or optical storage, network attached storage (NAS), or a storage area-network (SAN). Processor 202 communicates to other computing devices and systems via network interface 208, where network interface 208 is configured to transmit and receive data via a communications network.

The system memory 212 includes, without limitation, a policy configuration application 232 and a policy configuration database 234. The policy configuration application 232, when executed by the processor 202, performs one or more operations associated with policy configuration portal 108 of FIG. 1, as further described herein. In operation, policy configuration application 232 communicates with client device 102(1) over communications link 120 to receive information that includes, without limitation, the dynamic hostname associated with router 104 and various firewall rules and policies associated with router 104. Policy configuration application 232 then updates a record in policy configuration database 234 associated with router 104 to reflect the received information.

Policy configuration application 232 receives update messages from one or more name servers associated with dynamic DNS provider 106. The update messages identify a new IP address for a given hostname associated with router 104. In response, policy configuration application 232 updates the record in policy configuration database 234 associated with router 104 to reflect the new IP address for the hostname. In some embodiments, policy configuration application 232 receives such update messages directly from router 104.

In some embodiments, the update message may include authentication information, such as a token, that authenticates the identity of the dynamic DNS provider 106 or router 104 that transmitted the update message. In some embodiments, policy configuration portal 108 searches a database to determine whether the transmitter of the update message is authorized to change the IP address for the hostname identified in the message. If the transmitter of the update message is authorized to change the IP address for the hostname, then policy configuration portal 108 updates the current information for the hostname in the policy configuration database to reflect the new IP address. If the transmitter of the update message is not authorized to change the IP address for the hostname, then policy configuration portal 108 discards the message without updating the current information for the hostname in the policy configuration database.

Policy configuration application 232 transmits messages to global recursive resolvers 110 that include new IP addresses received from dynamic DNS provider 106, along with the corresponding firewall policy configuration, or at least a portion thereof, including firewall rules or policies. In so doing, policy configuration application 232 sets firewall rules or policies within global recursive resolvers 110 for the new IP address. Correspondingly, in some embodiments, policy configuration application 232 may further transmit messages to global recursive resolvers 110 with instructions to remove firewall policy configurations related to expired IP addresses.

It will be appreciated that the system shown herein is illustrative and that variations and modifications are possible. In one example, although the network addresses are described herein as IP addresses, any suitable network address may be employed within the scope of the disclosure.

Further, the present disclosure describes implementations of firewall rules and policies for dynamic DNS routers in conjunction with global recursive resolvers. Firewall rules and policies for a dynamic DNS account are transmitted, in the form of a firewall policy configuration, by a policy configuration portal to one or more global recursive resolvers. The global recursive resolvers then perform firewall filtering based on the firewall rules and policies transmitted by the policy configuration portal. However, other implementations are possible within the scope of this disclosure. In one example, and without limitation, the disclosed approach could be deployed to implement hypertext transfer protocol (HTTP) traffic filtering and related data communication traffic filtering for the World Wide Web. Such implementations could provide HTTP traffic and other data filtering as a cloud-based service. In another example, and without limitation, firewall filtering for dynamic DNS clients could be performed by a DNS firewall server rather than by global recursive resolvers. In such cases, the policy configuration portal transmits the firewall rules and policies for the dynamic DNS client to a DNS firewall server. The DNS firewall server could be implemented on the same computing device as the policy configuration portal or one or more other computing devices. In such cases, the DNS firewall server could perform DNS firewall filtering for dynamic DNS clients as a cloud-based service. The DNS firewall server would effectively act as a proxy for the dynamic DNS client's cleaned DNS traffic to one or more global recursive resolvers after the raw DNS traffic has been filtered according to the firewall rules or policies.

Figure 3A:
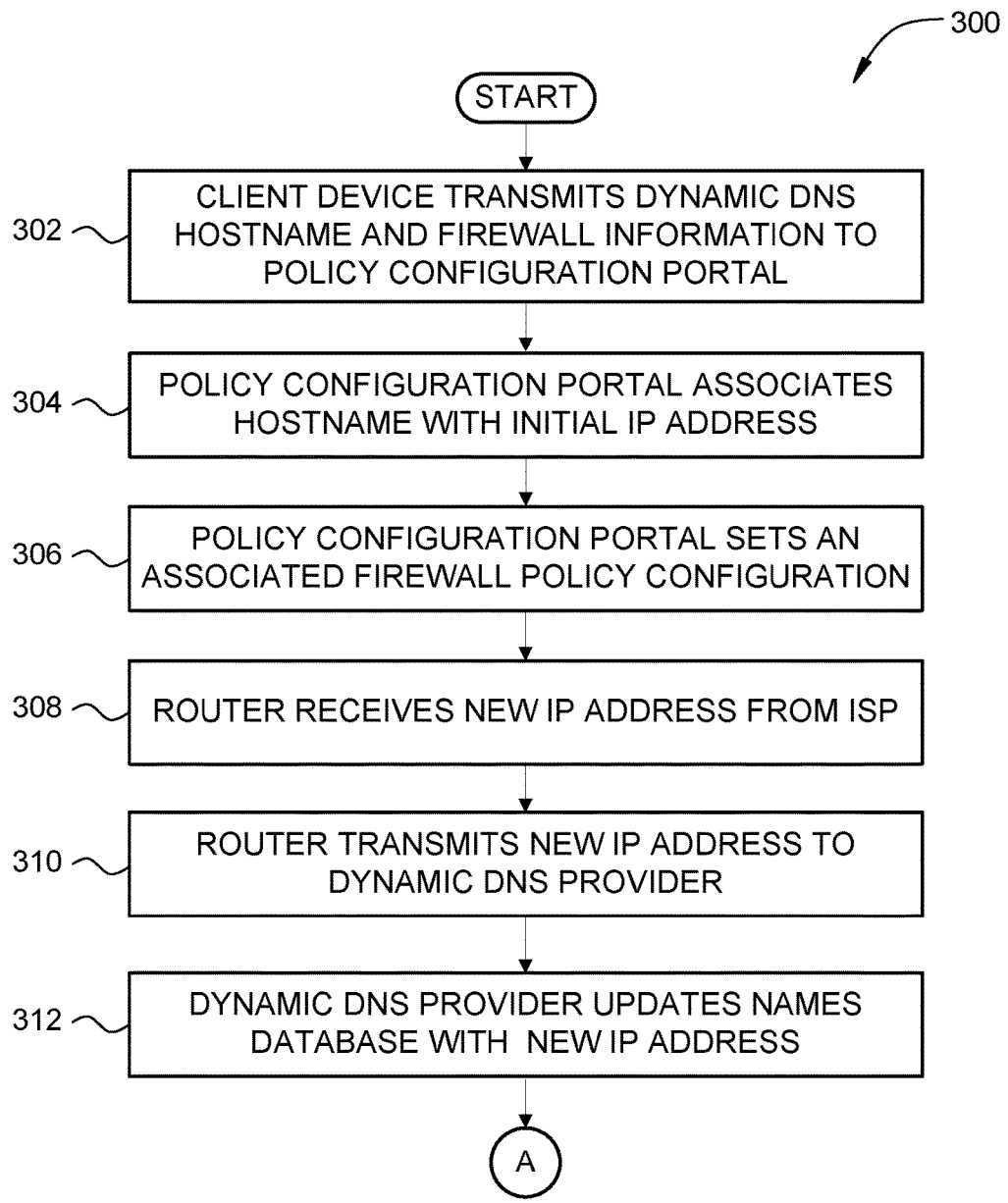
FIGS. 3A-3B set forth a flow diagram of method steps for associating a firewall policy with a dynamic domain name system (DNS) hostname via a dynamic DNS provider, according to various embodiments of the present invention.
Figure 3B:
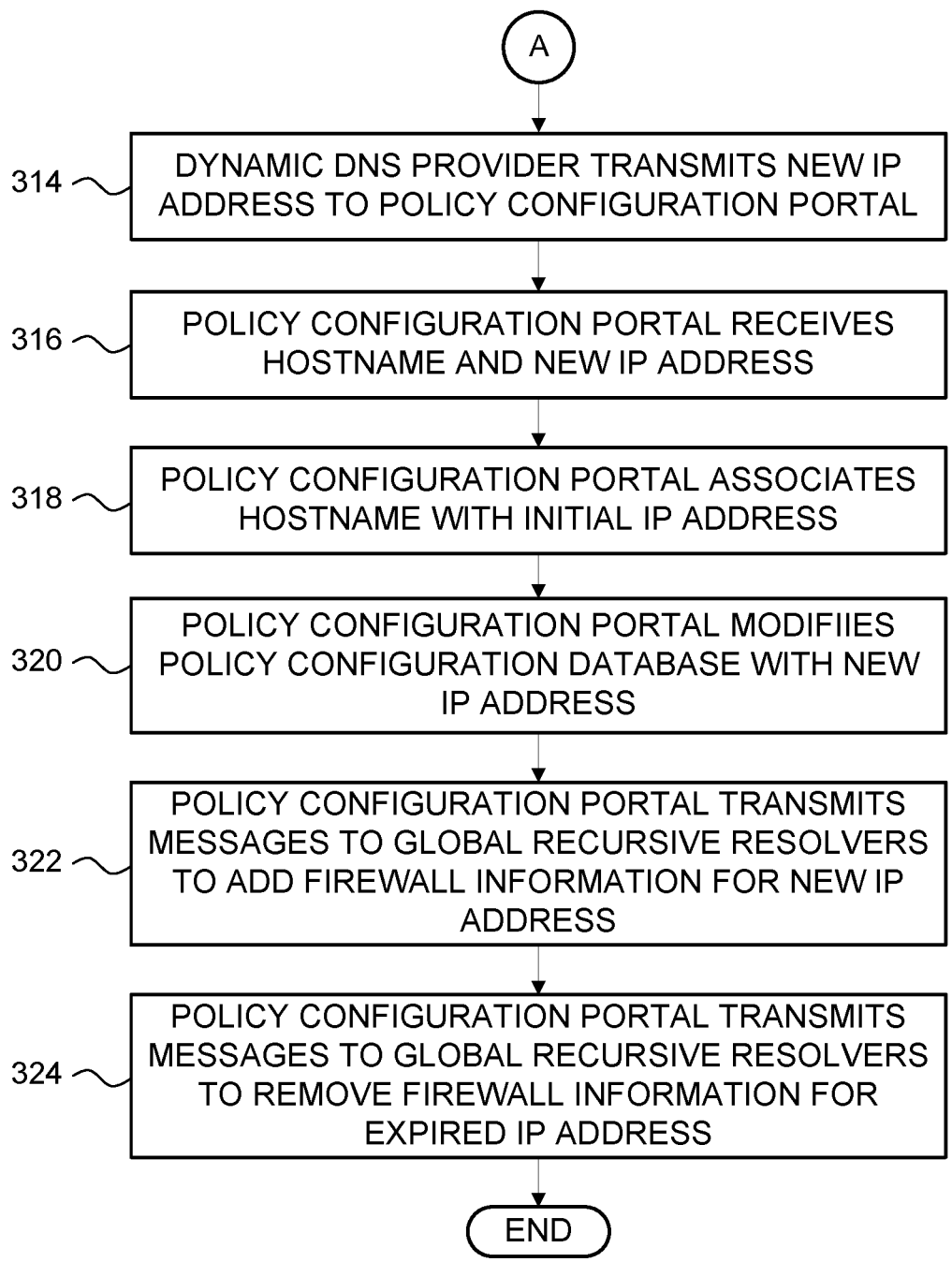

FIGS. 3A-3B set forth a flow diagram of method steps for associating a firewall policy with a dynamic domain name system (DNS) hostname via a dynamic DNS provider 106, according to various embodiments of the present invention. Although the method steps are described in conjunction with the systems of FIGS. 1-2, persons of ordinary skill in the art will understand that any system configured to perform the method steps, in any order, is within the scope of the present invention.

As shown, a method 300 begins at step 302, where a client device 102 transmits information to a policy configuration portal 108 regarding a dynamic DNS account associated with a firewall service. The information includes a dynamic DNS hostname along with firewall policy configuration that includes one or more firewall rules or policies. The firewall rules or policies define which forms of network traffic are considered to be trusted and secure and which forms of network traffic are not. The client device 102 also transmits information to a policy configuration portal 108 to identify the hostname and the initial IP address for the hostname. At step 304, policy configuration portal 108 associates the hostname with the initial IP address. At step 306, policy configuration portal 108 sets an associated firewall policy configuration for the hostname, including the firewalls and policies and the initial IP address.

At step 308, a router 104 associated with the dynamic DNS account receives a new IP address from an ISP. At step 310, router 104 transmits the new IP address and the corresponding dynamic DNS hostname to one or more name servers associated with a dynamic DNS provider 106. At step 312, one of the name servers associated with the dynamic DNS provider 106 updates a record in a names database to reflect that the new IP address is associated with the corresponding hostname.

At step 314, one of the name servers associated with the dynamic DNS provider 106 transmits a message to policy configuration portal 108 that includes the the new IP address and the corresponding dynamic DNS hostname. At step 316, policy configuration portal 108 receives the message from the name server that includes the dynamic DNS hostname and the new IP address. At step 318, policy configuration portal 108 associates the hostname with the new IP address.

At step 320, policy configuration portal 108 modifies a record in the policy configuration database to associate the new IP address with the dynamic DNS hostname. Correspondingly, the IP address previously associated with the dynamic DNS hostname is considered to be expired. In some embodiments, \policy configuration portal 108 authenticates the identity of the dynamic DNS provider 106. In some embodiments, \policy configuration portal 108 updates the IP address associated with the dynamic DNS hostname only if the dynamic DNS provider 106 is authorized to change the IP address for the given hostname.

At step 322, policy configuration portal 108 transmits messages to one or more global recursive resolvers 110 that include the new IP address and the corresponding firewall rules or policies, or at least a portion thereof. At step 324, policy configuration portal 108 transmits messages to one or more global recursive resolvers 110 to remove firewall rules or policies associated with the expired IP address. The method 300 then terminates.

Figure 4:
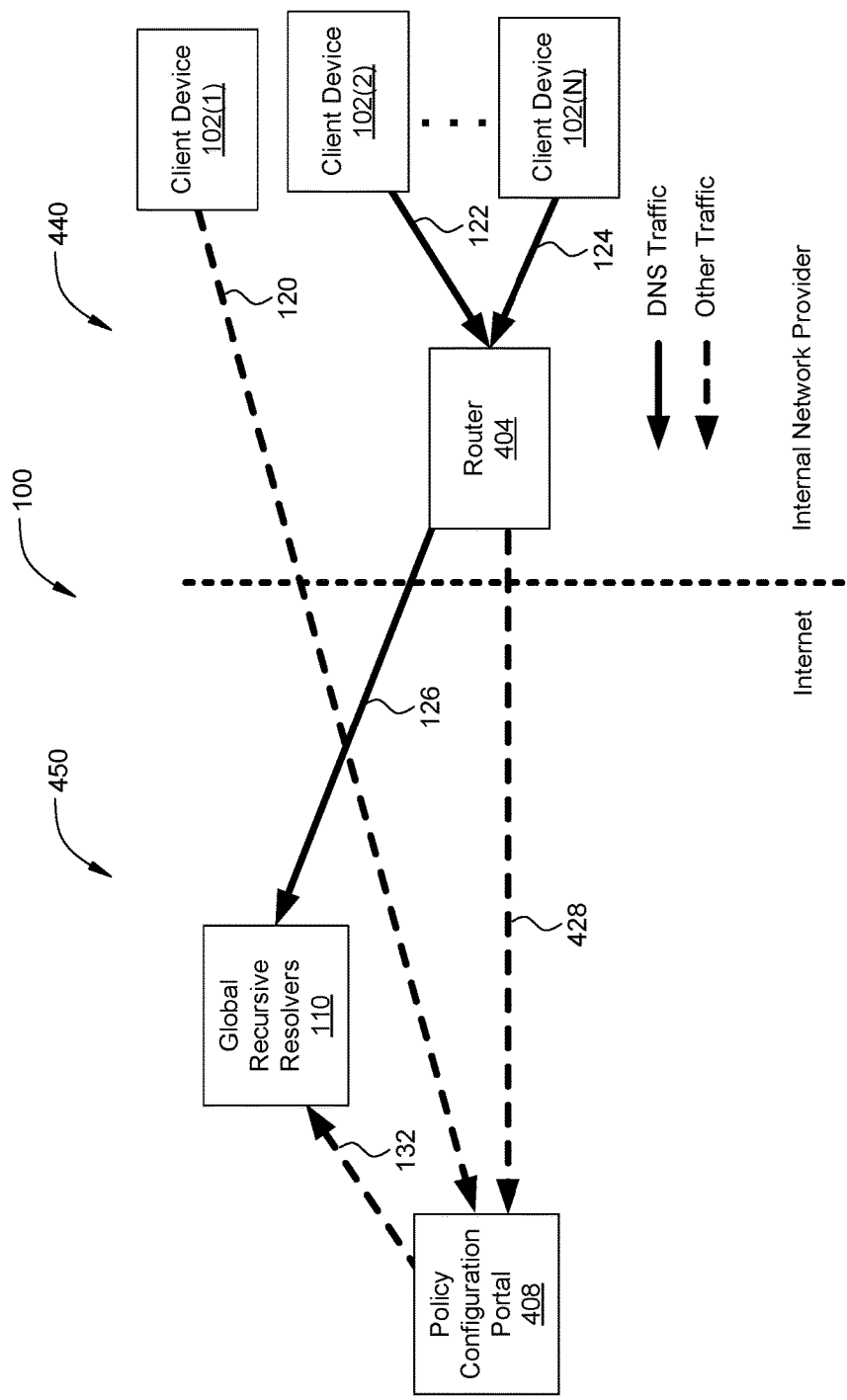
FIG. 4 illustrates another system configured to implement one or more aspects of the present invention.

FIG. 4 illustrates another system configured to implement one or more aspects of the present invention. As shown, the system includes, without limitation, client devices 102(1), 102(2), . . . 102(N), a router 404, a policy configuration portal 408, and global recursive resolvers 110. Client devices 102(1), 102(2), . . . 102(N), router 404, policy configuration portal 408, and global recursive resolvers 110 operate substantially the same as the corresponding elements described in conjunction with FIG. 1, except as further described below. Client devices 102(1), 102(2), . . . 102(N) and router 404 are associated with an internal network 440. Client devices 102(1), 102(2), . . . 102(N) and router 404 communicate with other devices connected to the internet 450, including, without limitation, policy configuration portal 408, and global recursive resolvers 110.

As shown in FIG. 4, router 404 communicates directly with policy configuration portal 408 over communications link 428. Periodically, router 404 receives a new IP address from an ISP (not explicitly shown). In some embodiments, router 404 receives a new IP address at regular intervals, including, without limitation, once every few hours, once per day, or once per week. In some embodiments, router 404 receives a new IP address upon the occurrence of a particular event.

In response to receiving a new IP address, router 404 transmits an update message to policy configuration portal 108 that includes the hostname associated with router 404 and the new IP address for router 404. In some embodiments, the update message may include authentication information, such as a token, that authenticates the identity of router 404. In some embodiments, the update message may include additional information such as an identifier of the dynamic DNS provider 106 or router 104 that transmitted the update message. Further, the update message may include customer profile specific resolution information. This customer profile specific resolution information may include, without limitation, client device identifier, username, age of the user, and geographic location.

Policy configuration portal 108 receives update messages from router 404 106. The update message includes the hostname associated with router 404 and the new IP address for the hostname associated with router 404. If the message includes authentication information, such as a token, policy configuration portal 408 authenticates the identity of router 404. In some embodiments, policy configuration portal 408 searches a database to determine whether router 404 is authorized to change the IP address for the hostname identified in the message. If router 404 is authorized to change the IP address for the hostname, then policy configuration portal 408 associates the hostname with the new IP address by updating the current information for the hostname in the policy configuration database to reflect the new IP address. In so doing, policy configuration portal 408 modifies the firewall rules and policies associated with the hostname to include the new IP address. If router 404 is not authorized to change the IP address for the hostname, then policy configuration portal 408 discards the message without updating the current information for the hostname in the policy configuration database.

Further, the update message may include customer profile specific resolution information. This customer profile specific resolution information may include, without limitation, client device identifier, username, age of the user, and geographic location. If the update message includes such customer profile specific resolution information, then policy configuration portal 408 updates the firewall rules and policies associated with the hostname to include the customer profile specific resolution information.

In various embodiments, messages exchanged between policy configuration portal 408 and router 404 may be DNS traffic or other types of traffic. In one example, and without limitation, router 404, when communicating over communication link 428, would be transmitting an update message in the form of a DNS lookup for a given FQDN. In such cases, the communications over communication link 130 would be DNS traffic.

Further, policy configuration portal 408 transmits messages to one or more global recursive resolvers 110 through communications link 132. In various embodiments, these messages may be DNS traffic or other types of traffic. The messages include the new IP address associated with the hostname and the corresponding firewall rules or policies, or at least a portion thereof. In so doing, policy configuration portal 408 sets firewall rules or policies within global recursive resolvers 110 for the new IP address. Correspondingly, in some embodiments, policy configuration portal 408 may further transmit messages to global recursive resolvers 110 with instructions to remove firewall rules or policies related to expired IP addresses.

Figure 5A:
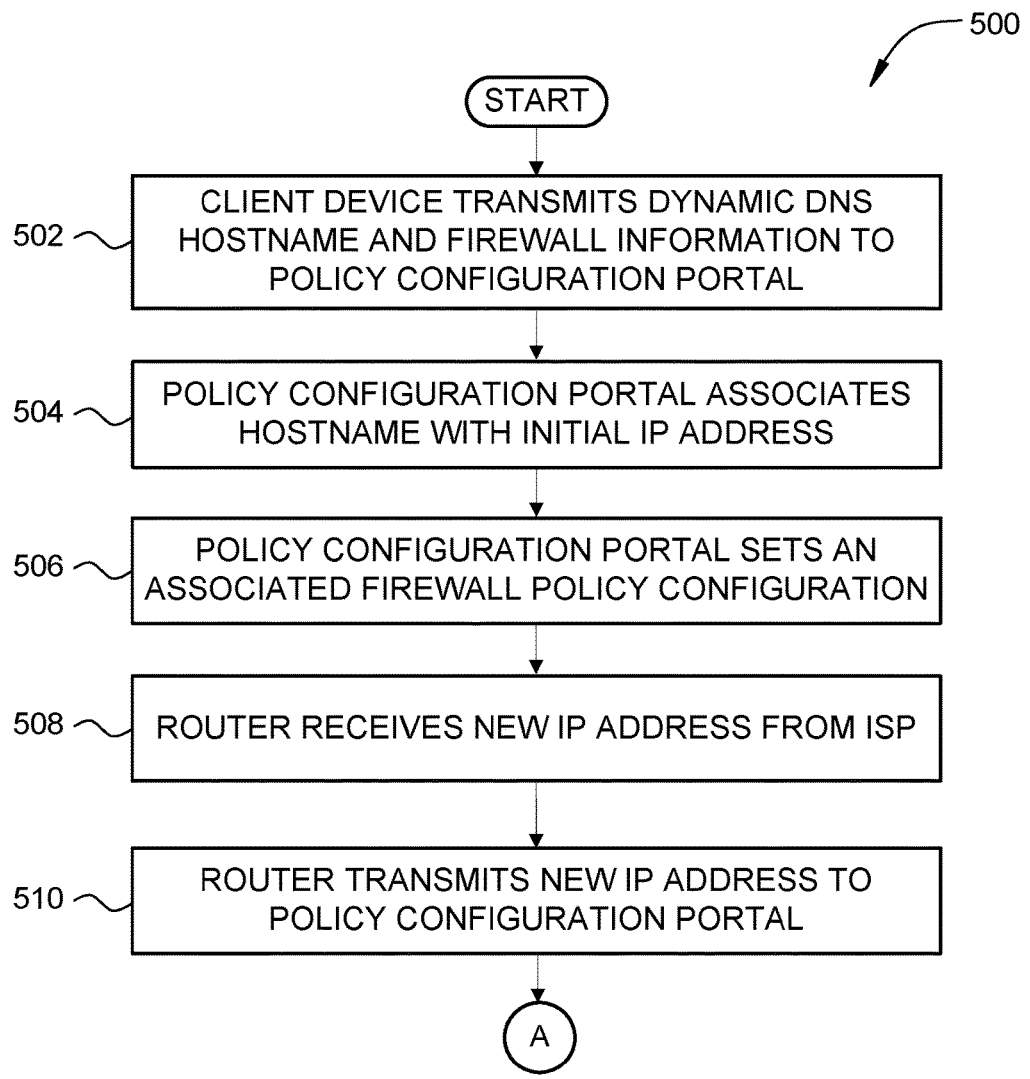
FIGS. 5A-5B set forth a flow diagram of method steps for associating a firewall policy with a dynamic domain name system (DNS) hostname via a router, according to various embodiments of the present invention.
Figure 5B:
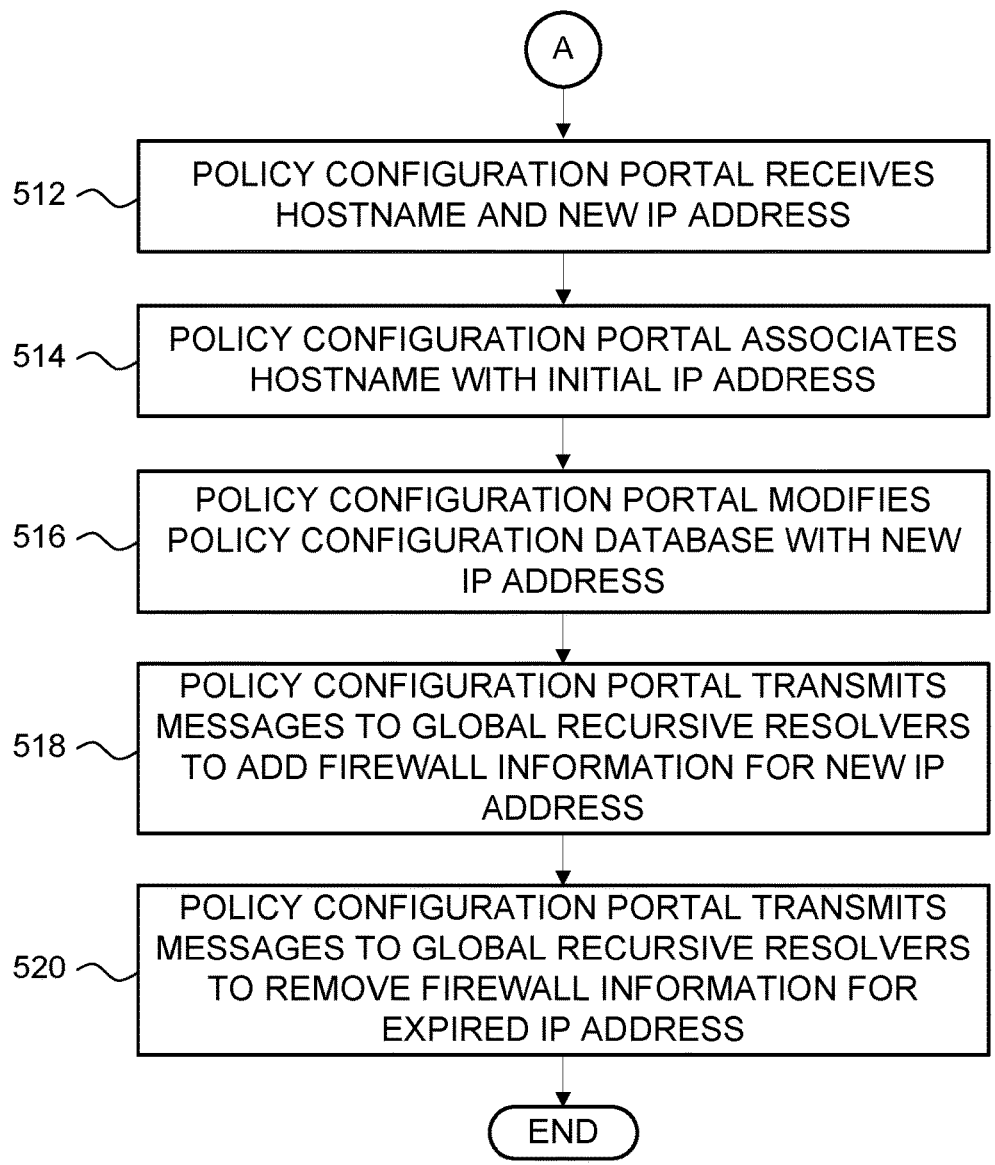

FIGS. 5A-5B set forth a flow diagram of method steps for associating a firewall policy with a dynamic domain name system (DNS) hostname via a router 404, according to various embodiments of the present invention. Although the method steps are described in conjunction with the systems of FIGS. 1-2, persons of ordinary skill in the art will understand that any system configured to perform the method steps, in any order, is within the scope of the present invention.

As shown, a method 500 begins at step 502, where a client device 102 transmits information to a policy configuration portal 408 regarding a dynamic DNS account associated with a firewall service. The information includes a dynamic DNS hostname along with one or more firewall rules or policies. The firewall rules or policies define which forms of network traffic are considered to be trusted and secure and which forms of network traffic are not. The client device 102 also transmits information to a policy configuration portal 108 to identify the hostname and the initial IP address for the hostname. At step 504, policy configuration portal 108 associates the hostname with the initial IP address. At step 506, policy configuration portal 108 sets an associated firewall policy configuration for the hostname, including the firewalls and policies and the initial IP address.

At step 508, a router 404 associated with the dynamic DNS account receives a new IP address from an ISP. At step 510, router 404 transmits a message to policy configuration portal 408 that includes the new IP address and the corresponding dynamic DNS hostname.

At step 512, policy configuration portal 408 receives the message from router 404 that includes the dynamic DNS hostname and the new IP address. At step 514, policy configuration portal 408 associates the hostname with the new IP address. At step 516, policy configuration portal 408 modifies a record in the policy configuration database to associate the new IP address with the dynamic DNS hostname. Correspondingly, the IP address previously associated with the dynamic DNS hostname is considered to be expired. In some embodiments, policy configuration portal 408 authenticates the identity of router 404. In some embodiments, policy configuration portal 408 updates the IP address associated with the dynamic DNS hostname only if the router is authorized to change the IP address for the given hostname. At step 518, policy configuration portal 408 transmits messages to one or more global recursive resolvers 110 that include the new IP address and the corresponding firewall rules or policies, or at least a portion thereof. At step 520, policy configuration portal 408 transmits messages to one or more global recursive resolvers 110 to remove firewall rules or policies associated with the expired IP address. The method 500 then terminates.

In sum, a policy configuration portal receives a hostname and associated firewall policy configuration information from a client device associated with a router that supports dynamic DNS operation. In operation, the router periodically receives new IP addresses related to the associated computing devices from an ISP. The router forwards the new IP addresses to one or more name servers associated with a dynamic DNS provider as the new IP addresses are received. One of the name servers, in turn, transmits an update message to the policy configuration portal, where the message includes the hostname and the new IP address. Alternatively, the router transmits the update message directly to the policy configuration portal. The policy configuration portal updates the firewall policy configuration information with the new IP address. The policy configuration portal transmits the updated firewall policy configuration information to globally located recursive resolvers. The recursive resolvers then resolve network traffic associated with the hostname by using the new IP address.

At least one advantage of the disclosed techniques is that a firewall policy can be implemented for a residential home, small business, or other entity that employs dynamic IP addressing. As a result, residential and small business users do not need to incur the expense of purchasing or leasing static IP addresses. Another advantage of the disclosed techniques is that changes are transmitted to the policy configuration portal soon after the new ISP address is received by the router. As a result, the amount of time that firewall protection is unavailable to dynamic DNS clients is reduced relative to prior approaches.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for associating a firewall policy with a dynamic domain name system (DNS) hostname, the method comprising:
   associating, by a policy configuration portal in an external network, a first hostname with a first network address associated with a device in an internal network;
   setting, by the policy configuration portal, a first firewall policy configuration associated with the first hostname to include the first network address;
   receiving, by the policy configuration portal, a first address update message that associates the first hostname with a second network address, wherein the second address is associated with the device in the internal network;
   in response to receiving the first address update message, associating, by the policy configuration portal, the second network address with the first hostname; and
   modifying the first firewall policy configuration to include the second network address instead of the first network address.

2. The computer-implemented method of claim 1, wherein the first address update message includes customer profile specific resolution information, and further comprising updating the first firewall policy configuration to include the customer profile specific resolution information.

3. The computer-implemented method of claim 1, further comprising:
   authenticating an identity of a transmitter of the first address update message; and
   determining that the transmitter is authorized to change a dynamic DNS address associated with the first hostname from the first network address to the second network address.

4. The computer-implemented method of claim 1, wherein the first message is received from a router in the internal network, wherein the router is associated with the first hostname.

5. The computer-implemented method of claim 1, wherein the first address update message is received from a name server in the external network, wherein the name server:
receives the second network address from a router in the internal network, wherein the router is associated with a first client device;
in response to receiving the second network address, associates the second network address with the first hostname; and
transmits the first address update including the first hostname and the second network address.

6. The computer-implemented method of claim 1, further comprising transmitting, to a recursive resolver in the external network, a first firewall policy configuration update message that includes:
the first network address; and
an indication that the first network address is expired.

7. The computer-implemented method of claim 6, wherein, in response to receiving the first firewall policy configuration update message, deleting, by the recursive resolver, a second firewall policy configuration associated with the first network address.

8. The computer-implemented method of claim 6, further comprising transmitting, to the recursive resolver, a second firewall policy configuration message that includes:
the second network address, and
the first firewall policy configuration,
wherein the recursive resolver applies the first firewall policy configuration to network traffic in the external network associated with the first hostname.

9. One or more non-transitory computer-readable storage media including instructions that, when executed by one or more processors, cause the one or more processors to associate a firewall policy with a dynamic domain name system (DNS) hostname, by performing the steps of:
associating, by a policy configuration portal in an external network, a first hostname with a first network address associated with a device in an internal network;
setting, by the policy configuration portal, a first firewall policy configuration associated with the first hostname to include the first network address;
receiving, by the policy configuration portal, a first address update message that associates the first hostname with a second network address, wherein the second address is associated with the device in the internal network;
in response to receiving the first address update message, associating, by the policy configuration portal, the second network address with the first hostname; and
modifying the first firewall policy configuration to include the second network address instead of the first network address.

10. The non-transitory computer-readable storage media of claim 9, wherein the instructions further comprise the steps of:
receiving the first hostname from a client device related to the first hostname, wherein the client device is in the internal network; and
modifying the first firewall policy configuration to include the first hostname.

11. The non-transitory computer-readable storage media of claim 10, wherein the client device is associated with a router in the internal network that supports dynamic DNS.

12. The non-transitory computer-readable storage media of claim 11, wherein a name server in the external network is associated with a dynamic DNS provider, and the instructions further comprise the steps of:
receiving, by the router from an internet services provider (ISP), the second network address; and
transmitting, by the router to the name server, the second network address.

13. The non-transitory computer-readable storage media of claim 9, wherein the instructions further comprise the steps of:
authenticating an identity of a transmitter of the first address update message; and
determining that the transmitter is authorized to change a dynamic DNS address associated with the first hostname from the first network address to the second network address.

14. The non-transitory computer-readable storage media of claim 9, wherein the first address update message is received from a router associated with the first hostname, wherein the router is in the internal network.

15. The non-transitory computer-readable storage media of claim 9, wherein the first message is received from a name server in the external network.

16. The non-transitory computer-readable storage media of claim 15, wherein the name server is associated with a dynamic DNS provider.

17. The non-transitory computer-readable storage media of claim 15, wherein the instructions further comprise the steps of:
receiving, by the name server from a router in the internal network associated with the client device, the second network address; and
in response to receiving the second network address, associating, by the name server, the second network address with the first hostname.

18. The non-transitory computer-readable storage media of claim 9, wherein the instructions further comprise the steps of:
after modifying the first firewall policy configuration, transmitting, to a recursive resolver in the external network, a first firewall policy configuration update message that includes:
the second network address, and
the first firewall policy configuration,
wherein the recursive resolver applies the first firewall policy configuration to network traffic in the external network associated with the first hostname.

19. A computing device in an external network, comprising:
a memory that includes a policy configuration application; and
a processor that is coupled to the memory and, when executing the policy configuration application, is configured to:
associate a first hostname with a first network address associated with a device in an internal network;
set a first firewall policy configuration associated with the first hostname to include the first network address;
receive a first address update message that associates the first hostname with a second network address, wherein the second address is associated with the device in the internal network;
in response to receiving the first address update message, associate the second network address with the first hostname; and modify the first firewall policy configuration to include the second network address instead of the first network address.

20. The computing device of claim 19, wherein, when executing the policy configuration application, the processor is further configured to transmit, to a recursive resolver, a first policy configuration update message that includes the first firewall policy configuration.

* * * * *